3,091,539
METHOD OF PRODUCING CHEESE
Toichi Chikuma, Kawagoe City, Japan, assignor to Goro Chikuma, Chiba City, Japan
No Drawing. Filed Dec. 2, 1960, Ser. No. 73,204
Claims priority, application Japan July 10, 1960
3 Claims. (Cl. 99—116)

The present invention relates to an improved cheese product and, a new and improved process of cheese preparation in which curds are treated by the steps of freezing, melting, pressing, salting and then ripening.

A plurality of types of cheeses are known as Cheddar cheese, Goude cheese, Gruyère cheese, Edam cheese, Camembert cheese, Limburger cheese, Brie cheese, Gorgonzola cheese, Roquefort cheese, Stilton cheese, process cheese, cottage cheese and Neufchatel cheese.

In the known processes of preparing cheeses, curds were treated at comparatively high temperature, e.g. such as 30°–70° C. in which "whey" was excluded, after that, thus obtained were salted, pressed and ripened as it was required.

In a known process of cheese preparation milk is coagulated, a starter such as *Strep. lactis*, etc., is added subsequently, adding a coagulator such as rennet or the like, whereby curds are obtained.

Curds were dehydrated by heating in order to exclude "whey," and salt was added, subsequently they were pressed and then ripened.

In the dehydrating process by heating, large and spacious equipment, such as a cheese vat, a curd knife, a mixer, etc. have been used.

Moreover, the process of heating the curds was exceedingly difficult, because highest skill and experience were required for the process of heating and dehydrating, furthermore it was not suitable for mass production, since the known process requires an exceedingly time consuming operation. Usually, curds which were coagulated by adding a coagulator such as rennet and the like were exceedingly soft and fragile, at the process of heating curds, curds had to be stirred taking care that they do not break and do not adhere to each other. Moreover, in order to avoid preventing evaporation of the water of the curds, no more than the surface water of the curds, the latter were heated at a temperature range from 30° C. to 38° C., at first at the rate of 1° C. at 8 min., and later at the rate of 1° C. at 4 min.

As above mentioned, in the known process of cheese preparation by heating carefulness and experience were indispensably required and equipment such as a jacketed cheese-vat and a curd knife were needed in the process of heating the curd.

It is known that milk is frozen in the pasteurization process, and cheese products are frozen in the process of ripening and storing, but it is one object of the present invention to provide a method according to which curd is frozen and then subjected to melting in water, hereafter compressed by a press and, lastly ripened in known manner.

Thus, the present invention relates to a process of cheese preparation comprising the step of freezing the curd and then melting the latter in water and pressing the same for the dehydration of curds. In accordance with the present invention curds are prepared by a known process, and thus the obtained curds are instantly cooled and frozen at an exceedingly low temperature, after that the curds are fed into a filter such as a cloth bag etc., and then they are subjected to melting by putting the same into water or adding water at a suitable temperature, and the remainder in the filter is collected and compressed in a press box, the resulting material obtained being inserted into a salt solution, and then ripened in known manner.

In the process of freezing the curd, a continuous or a semi-continuous system may be employed and the freezing temperature must be suitable for freezing the curd, and a temperature range of about −20° C. to −30° C. is preferred.

The process of compressing is employed, before the material is subjected to the process of salting.

Also, the process in accordance with the present invention may be applied to the manufacture of casein, and the present invention is not only applied to the cheese manufacturing process, but also to the casein manufacturing process.

In the present invention, the equipment, such as a jacketed cheese-vat, a curd knife, a stirrer, etc., which were used in known processes of cheese preparation, are not needed in the process according to the present invention, and also, it is not necessary to apply skill and experience, such as for stirring without breaking soft curds during the heating up period.

Therefore, in accordance with the present invention, the required equipment for performing the process itself are simplified, moreover, the required labor is appreciably reduced, since a semi-continuous system may be employed, furthermore it is very suitable for mass production, since the frozen curd can be stored.

The product which is obtained in the process of the present invention is superior to the product arrived at in the known processes, and particularly, soft cheese, as cottage cheese or the like, which is obtained in this process contains less lactic acid and is suitable for storage.

The following example is a further illustration of the present invention, but it is to be understood that the present invention is not limited thereto.

Example 1

30 kg. of sterilized milk containing 3.2% of fat by weight of total composition is transferred into a cylindrical jacket equipped with a stirrer and made of stainless steel. Some kind of starter, such as *Strep. lactis* or lactic acid bacilli in skimmed milk, are added to said milk, the latter having a lactic acid content of about 0.160% by weight of total milk. Then 1.5 g. of rennet i.e. a kind of proteinase is added. The mixture is then fed into a vat and maintained at room temperature for 15 min., and thus a coagulated mixture, which is called curd, is obtained. This curd is instantly frozen in the freezing room at a temperature of about −30° C. and then fed into the filter of cloth, whereupon it is subjected to melting by setting it into warm water of a temperature of about 40° C.

Small lumps which remain in the filter are transferred to a rectangle case of a size of 25 x 12.5 x 20 cm., and there compressed under a weight of 5 kg. for 15 hours.

Thereafter this pressed lump is set into a saturated aq. solution of salt, and as a result of the described process, a cheese product in accordance with the present invention is obtained. The yield is 2.9 kg.

While I have disclosed one embodiment of the present invention, it is to be understood that this embodiment is given by example only and not in a limiting sense, the scope of the present invention being determined by the object and the claims.

I claim:
1. A method of producing casein which comprises the steps of coagulating milk to prepare a curd, adding a starter and a coagulator, then freezing the resulting product at a temperature below freezing, subjecting said frozen curd to melting in warm water, and then compressing to dehydrate.

2. A method of producing a cheese product which comprises the steps of coagulating milk to prepare a curd, adding a starter and a coagulator, then freezing the resulting product at a temperature below freezing, subjecting said frozen curd to melting in warm water, then compressing to dehydrate, and finally salting and ripening.

3. A method of producing a cheese product which comprises the steps of coagulating milk to prepare a curd, adding a starter and a coagulator, then freezing the resulting product at a temperature range of about −20° C. to −30° C., melting said frozen curd by setting it into water of about 40° C., then compressing to dehydrate, salting the compressed product by setting it into a saturated aqueous solution of salt, and finally ripening said product.

References Cited in the file of this patent

UNITED STATES PATENTS

| | | |
|---|---|---|
| 2,446,550 | North et al. | Aug. 10, 1948 |
| 2,789,909 | Flosdorf et al. | Apr. 23, 1957 |
| 2,997,395 | Berridge | Aug. 22, 1961 |